(12) United States Patent
Burford et al.

(10) Patent No.: US 11,999,004 B2
(45) Date of Patent: Jun. 4, 2024

(54) SYSTEMS AND METHODS FOR INTERNAL CHANNEL FORMATION WITHIN A WORKPIECE

(71) Applicant: UNIVERSITY OF NORTH TEXAS, Dallas, TX (US)

(72) Inventors: Dwight A. Burford, Dallas, TX (US); Rajiv Mishra, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 0 days.

(21) Appl. No.: 17/585,085

(22) Filed: Jan. 26, 2022

(65) Prior Publication Data
US 2022/0234132 A1    Jul. 28, 2022

Related U.S. Application Data

(60) Provisional application No. 63/141,883, filed on Jan. 26, 2021.

(51) Int. Cl.
*B23K 20/00*    (2006.01)
*B23K 20/12*    (2006.01)

(52) U.S. Cl.
CPC ...... *B23K 20/1215* (2013.01); *B23K 20/1255* (2013.01)

(58) Field of Classification Search
CPC ............ B23K 20/1255; B23K 20/1215; B23K 20/122; B23K 20/123; B23K 20/125
See application file for complete search history.

(56) References Cited

U.S. PATENT DOCUMENTS

| | | | |
|---|---|---|---|
| 6,669,075 | B2 | 12/2003 | Colligan |
| 7,354,657 | B2 | 4/2008 | Mishra |
| 7,942,306 | B2 | 5/2011 | Burford |

(Continued)

FOREIGN PATENT DOCUMENTS

| | | | |
|---|---|---|---|
| GB | 2306366 A | 5/1997 | |
| GB | 2614889 A | 7/2023 | |

(Continued)

OTHER PUBLICATIONS

L. Wan, et al., entitled, Friction stir welding of aluminum hollow extrusion: weld formation and mechanical properties, Materials Science and Technology, 31:12, pp. 1433-1442.

(Continued)

*Primary Examiner* — Erin B Saad
(74) *Attorney, Agent, or Firm* — Andrew M. Metrailer; Conley Rose, P.C.

(57) ABSTRACT

A method of forming an internal channel within a workpiece. In an embodiment, the method includes (a) rotating a tool about a central axis, wherein the tool includes: a shoulder; a pin extending axially from the shoulder; and a flange mounted to the pin that is spaced from the shoulder along the central axis. In addition, the method includes (b) moving the tool across the workpiece in a radial direction with respect to the central axis during (a). Further, the method includes (c) engaging the shoulder of the tool with an outer surface of the workpiece during (a) and (b), (d) submerging the pin and the flange within the workpiece during (a) and (b); and (e) forming the internal channel with the flange during (a) and (b).

19 Claims, 18 Drawing Sheets

(56) References Cited

U.S. PATENT DOCUMENTS

| | | | |
|---|---|---|---|
| 8,104,664 B2* | 1/2012 | Kato | B23K 20/1265 228/2.1 |
| 11,052,480 B2* | 7/2021 | Karvinen | B23K 20/1215 |
| 11,059,125 B2* | 7/2021 | Rosal | B23K 20/1255 |
| 11,260,468 B2* | 3/2022 | Frank | B23K 20/00 |
| 11,298,777 B2* | 4/2022 | Zhao | B23K 20/1255 |
| 11,654,508 B2* | 5/2023 | Hori | B23K 20/129 228/101 |
| 2003/0209588 A1* | 11/2003 | Colligan | B23K 20/1255 228/2.1 |
| 2004/0060965 A1* | 4/2004 | Mishra | B23K 20/123 228/2.1 |
| 2011/0101071 A1* | 5/2011 | Kato | B23K 20/1255 228/2.1 |
| 2012/0298724 A1* | 11/2012 | Kato | B23K 20/126 228/2.1 |
| 2019/0275607 A1* | 9/2019 | Tomioka | B23K 20/12 |
| 2019/0283931 A1* | 9/2019 | Westendorf | B65D 19/0012 |
| 2022/0234132 A1* | 7/2022 | Burford | B23K 20/1215 |
| 2023/0052271 A1 | 2/2023 | Martin | |

FOREIGN PATENT DOCUMENTS

| | | |
|---|---|---|
| WO | 9952669 A1 | 10/1999 |
| WO | 2018083438 A1 | 5/2018 |

OTHER PUBLICATIONS

L. Wan, et al., entitled, "Mechanical Properties and Microstructure of 6082-T6 Aluminum Alloy Joints by Self-support Friction Stir Welding," J. Mater. Sci. Technol., 2014, 30(12), pp. 1243-1250.

Y. Huang, et al., entitled, "The weld formation of self-support friction stir welds for aluminum hollow extrusion," Int J Adv ManufTechnol (2016) 87:1067-1075.

\* cited by examiner

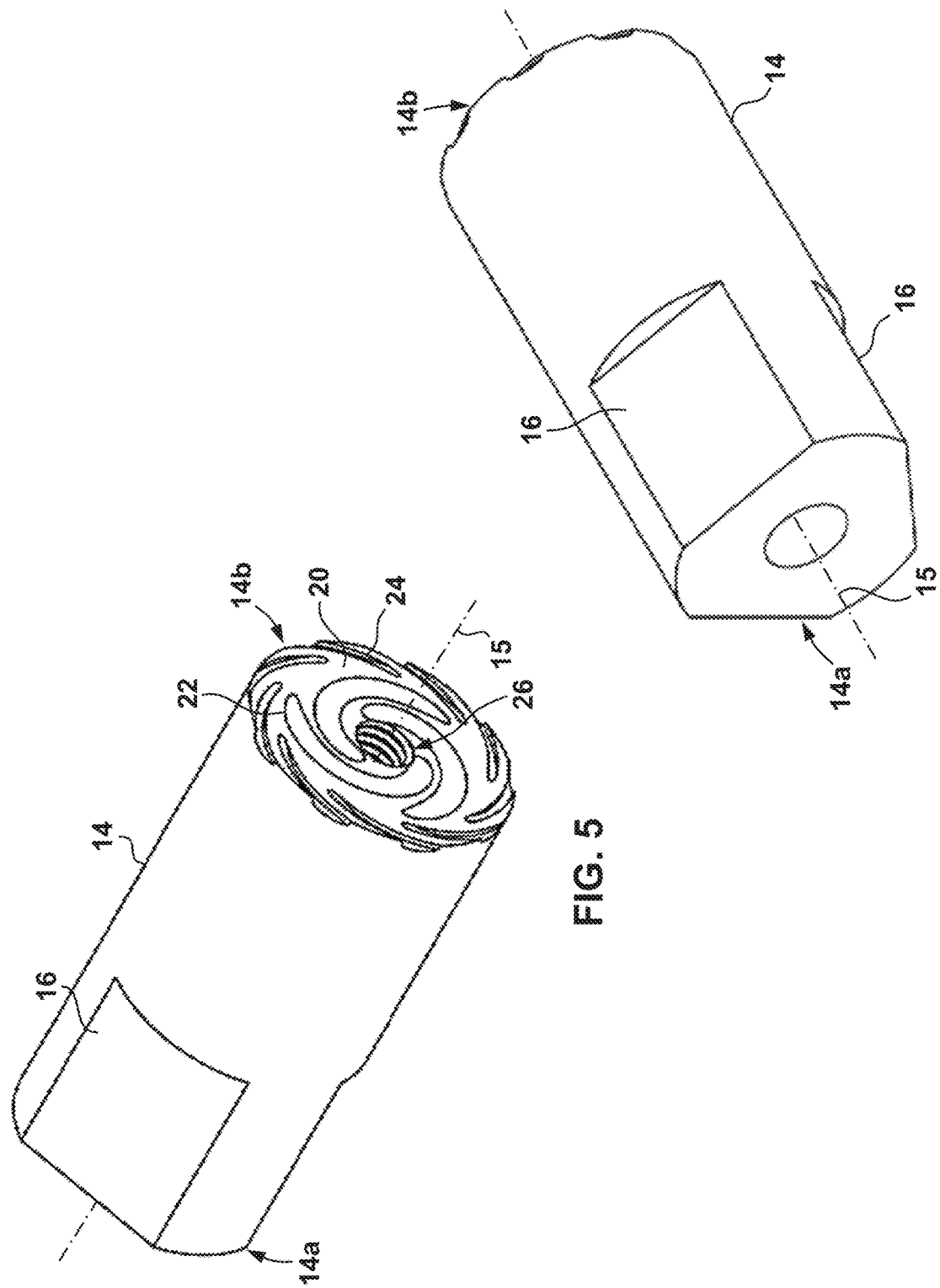

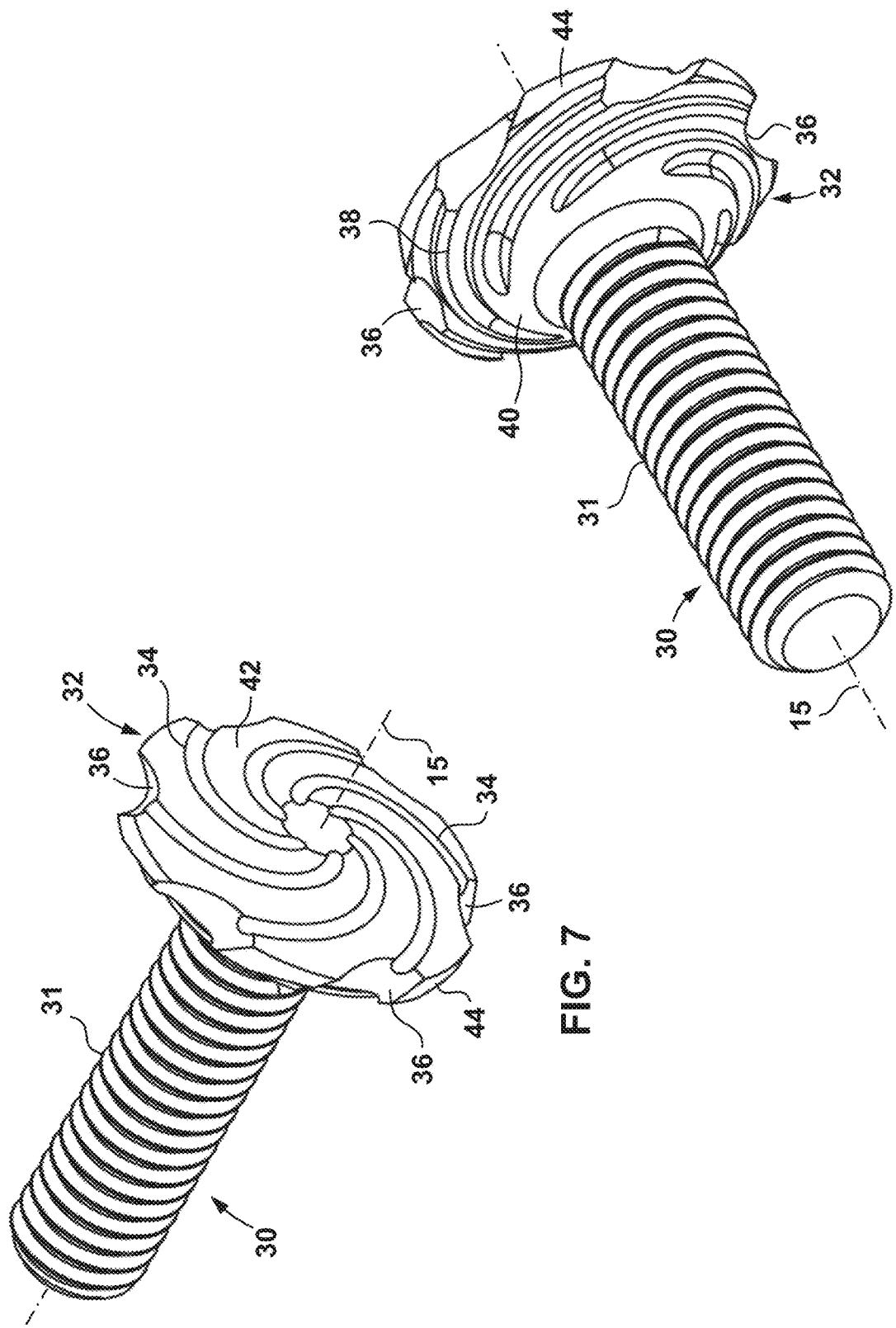

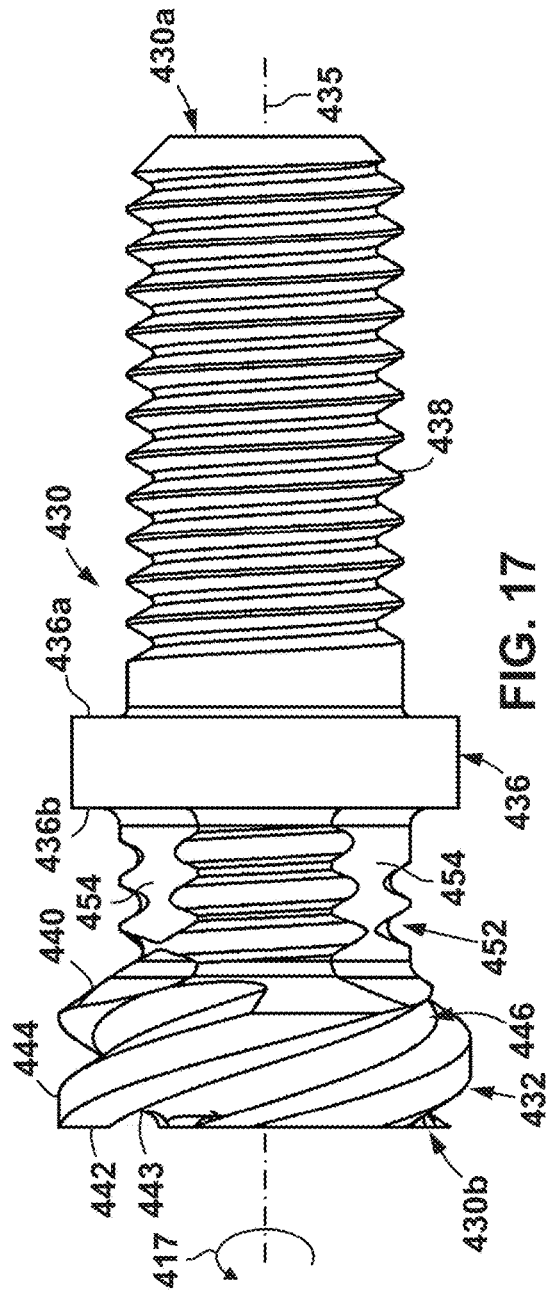

SYSTEMS AND METHODS FOR INTERNAL CHANNEL FORMATION WITHIN A WORKPIECE

CROSS-REFERENCE TO RELATED APPLICATIONS

This application claims benefit of U.S. Provisional Application No. 63/141,883 filed Jan. 26, 2021 and entitled "Systems and Methods for Internal Channel Formation with a Workpiece," which is hereby incorporated herein by reference in its entirety.

STATEMENT REGARDING FEDERALLY SPONSORED RESEARCH OR DEVELOPMENT

Not applicable.

BACKGROUND

Friction stir welding is a solid-state process whereby two or more workpieces are joined together through heat and pressure generated by the engagement of a specially designed welding tool. A friction stir welding tool includes a pin that is inserted into the joint (of the two workpieces) and a shoulder that is applied against an upper surface of the workpieces. The pin and shoulder rotate while in contact with the workpieces to generate sufficient friction to weld the work pieces to one another during operations. Similarly, friction stir processing involves passing a friction stir welding tool through a single workpiece to modify the microstructure and/or the form of the workpiece without joining it to other workpieces.

BRIEF SUMMARY

Some embodiments disclosed herein are directed to a method of forming an internal channel within a workpiece. In some embodiments, the method includes (a) rotating a tool about a central axis. The tool includes a shoulder, a pin extending axially from the shoulder, and a flange mounted to the pin that is spaced from the shoulder along the central axis. In addition, the method includes: (b) moving the tool across the workpiece in a radial direction with respect to the central axis during (a); (c) engaging the shoulder of the tool with an outer surface of the workpiece during (a) and (b); (d) submerging the pin and the flange within the workpiece during (a) and (b); and (e) forming the internal channel with the flange during (a) and (b).

Some embodiments disclosed herein are directed to a tool for forming an internal channel within a workpiece. In some embodiments, the tool includes a tool body including a central axis and a shoulder, and a pin projected outward from the shoulder along the central axis. The pin includes a flange that is axially spaced from the shoulder along the central axis, and the shoulder includes a plurality of spiral grooves.

Some embodiments disclosed herein are directed to the shoulder includes a plurality of spiral grooves. The workpiece includes a first surface, a second surface opposite the first surface, and a groove extending into the first surface that extends across the workpiece. In some embodiments, the method includes (a) rotating a tool about a central axis. The tool includes a shoulder, a pin extending axially from the shoulder, and a flange mounted to the pin that is spaced from the shoulder along the central axis. In addition, the method includes: (b) inserting the tool into the workpiece from the first surface such that the flange is positioned between the first surface and the second surface; (c) moving the tool across the workpiece along the groove in a radial direction with respect to the central axis; (d) engaging the shoulder of the tool with the first surface of the workpiece during (c); and (e) forming the internal channel with the flange during (c) and (d).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 5 and 6 are perspective views of the tool body of the tool in FIGS. 3 and 4 according to some embodiments;

FIGS. 7 and 8 are perspective views of the pin and the flanges of the tool of FIGS. 3 and 4 according to some embodiments;

FIG. 17 is a side view of a pin of the tool of FIG. 12 according to some embodiments;

FIG. 18 is a side cross-sectional view of the pin of FIG. 17 according to some embodiments;

DETAILED DESCRIPTION

Figure 1:
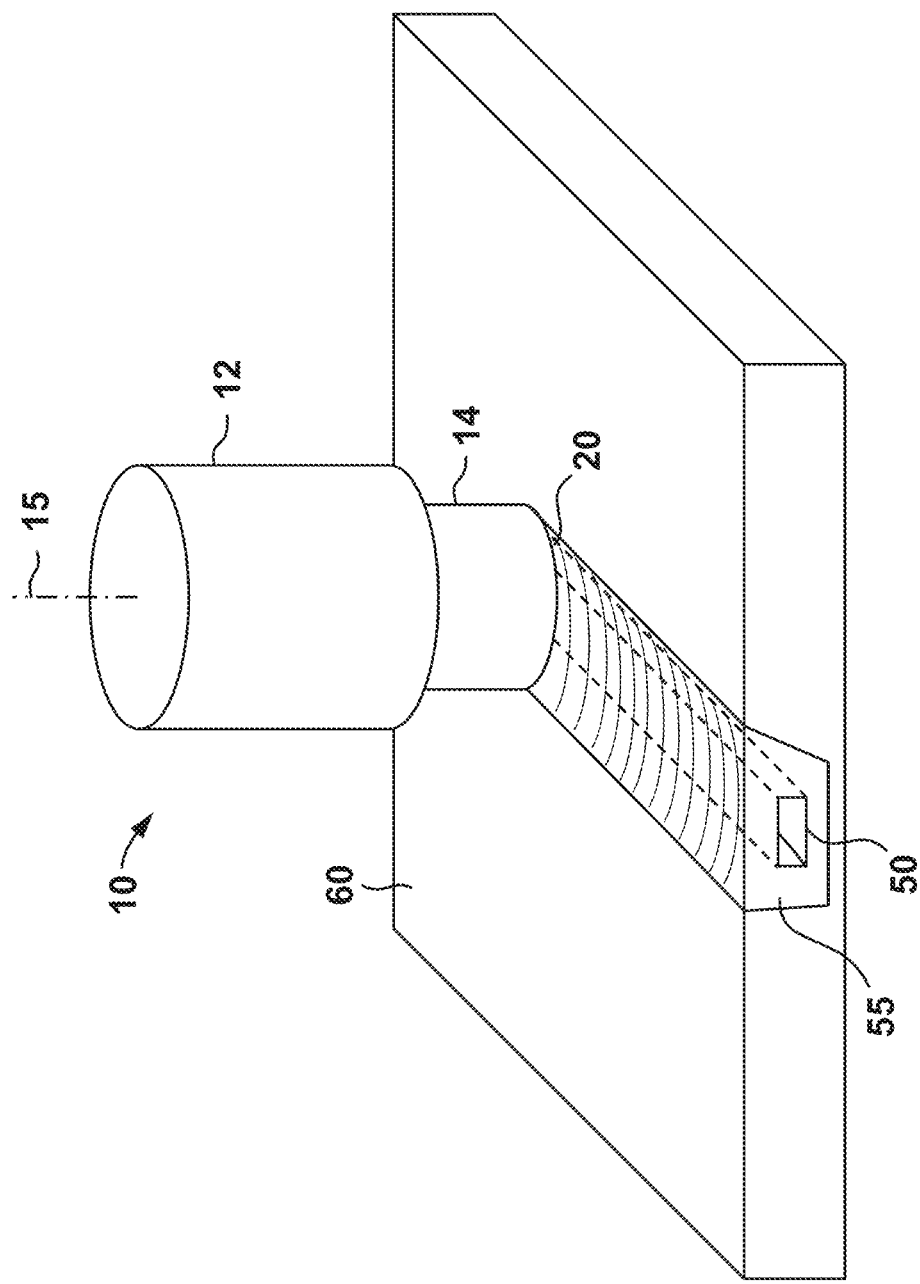
FIG. 1 is a perspective view of a tool performing a friction stir processing operation to form an internal channel within a workpiece according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis, while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, friction stir processing is a process whereby the microstructure and/or form of a workpiece is modified via frictional engagement with a rotating tool. In some instances, one may wish to form an internal channel within a workpiece that may receive a flow of fluids (e.g., air, water, refrigerant) during operations. For instance, one may wish to form an internal channel in a heat exchange device, such as a cooling plate. In other instances, internal channels may provide a conduit for cabling (e.g., electrical cables, fiber optic cables), or may receive injectable materials (e.g., polymers) that modify one or more characteristics of a workpiece (e.g., elasticity, stiffness, etc.).

Accordingly, embodiments described herein include tools and related methods for forming internal channels within a workpiece. Embodiments of the tools disclosed herein may include a bobbin configuration having two opposing surfaces separated along a cylinder or pin that is aligned with a central axis of the tool. During operations, one of the surfaces is submerged within the material of the workpiece as the tool is rotated about the central axis, so as to form the internal channel. Through use of the embodiments disclosed herein, internal channels may be formed within a workpiece that are sealed from the outside environment by the monolithic, one-piece material of the workpiece itself.

Figure 2:
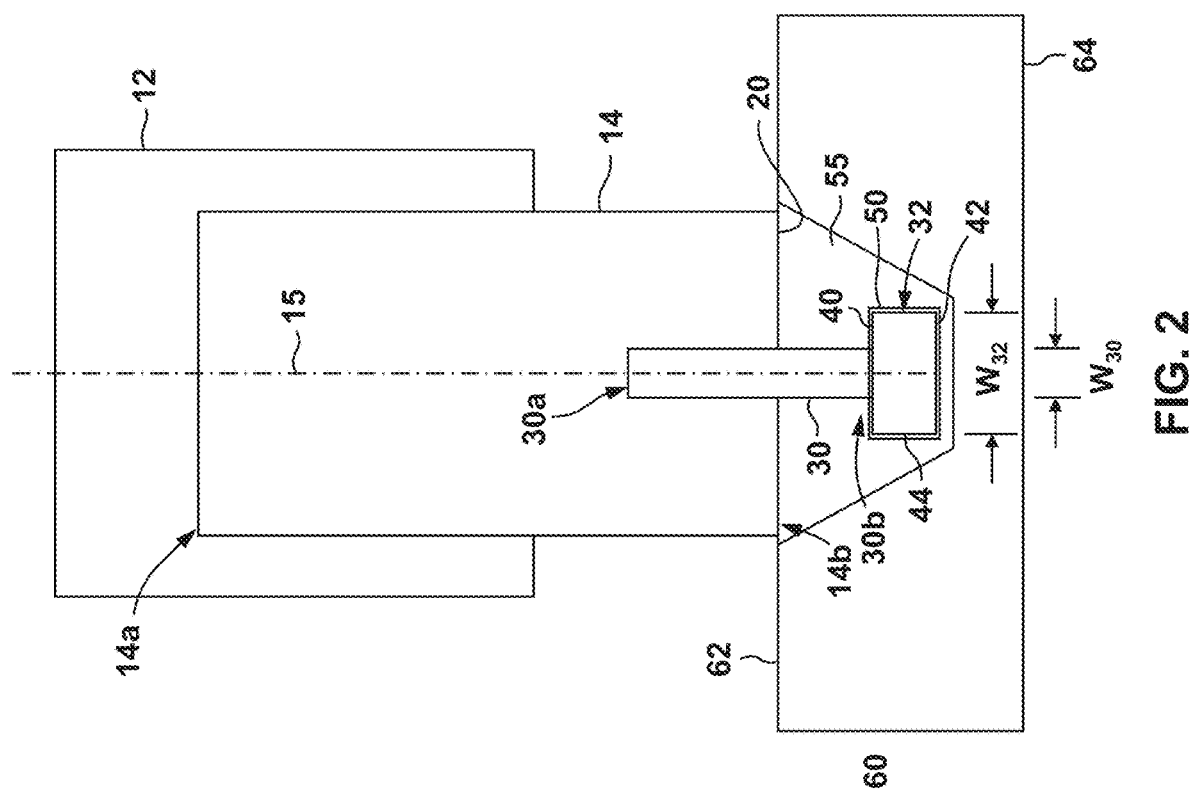
FIG. 2 is a side, cross-sectional view of the tool performing the friction stir processing operation of FIG. 1 according to some embodiments.

Referring now to FIGS. 1 and 2, welding tool 10 for forming an internal channel 50 within a workpiece 60 according to some embodiments is shown. The workpiece 60 may comprise a wide variety of materials, such as, a metal (e.g., aluminum, aluminum alloys, titanium, titanium alloys, steel, copper, magnesium, magnesium alloys, ferrous alloys), or a non-metal (e.g., polymers).

The tool 10 comprises a tool body 14 that is engaged with a rotational driver 12 (e.g., a chuck of a drill press, lathe, computer numerical control (CNC) machine, or other rotatable piece of equipment). The tool body 14 includes a central, longitudinal axis 15. During operations, the rotational driver 12 rotates the tool body 14 about axis 15 while engaging tool body 14 with workpiece 60 so as to form a deformed region 55 within the workpiece 60 that includes the internal channel 50 as described in more detail below.

As best shown in FIG. 2, tool body 14 includes a first or upper end 14a and a second or lower end 14b opposite upper end 14a. A radially extending shoulder 20 is defined on lower end 14b. Shoulder 20 may include a number of configurations and shapes in various embodiments such as, flat, tapered, convex, concave, etc. Shoulder 20 may be referred to herein as an "inner flange" of tool 10.

In addition, a pin 30 extends axially from lower end 14b. Specifically, pin 30 includes a first or an upper end 30a that is inserted into lower end 14b of tool body 14 and a second or lower end 30b extended or projected axially away from lower end 14b of tool body 14 along axis 15.

An outer flange 32 is formed on lower end 30b of pin 30. Flange 32 may have a maximum radial width $W_{32}$ that is larger than a maximum radial width $W_{30}$ of the pin 30. The radial widths $W_{32}$, $W_{30}$ may be measured along the radial direction of axis 15. The outer flange 32 and shoulder 20 (or "inner flange 20") are axially spaced from one another along axis 15 via pin 30 so that tool 10 may have a bobbin configuration as generally noted above.

Flange 32 includes a first or upper surface 40, a second or lower surface 42, and a radially outer surface 44 extending axially between upper surface 40 and lower surface 42. In some embodiments, the upper surface 40 and/or lower surface 42 may be planar and may extend radially with respect to axis 15. In some embodiments, upper surface 40 and/or lower surface 42 may comprise a number of different shapes or configurations. For instance, in some embodiments, as described in more detail below, upper surface 40 may be frustoconical in shape, or may have other concave or convex curvatures. In addition, in some embodiments, lower surface 42 may be hemispherical, concave, convex, conical, frustoconical, etc.

Referring again to FIGS. 1 and 2, during operations, the rotational driver 12 rotates tool 10 about axis 15, while tool body 14, pin 30, and flange 32 are engaged with workpiece 60 to form deformed region 55 and channel 50. In particular, shoulder 20 is engaged with an upper surface 62 of workpiece 60 while pin 30 and flange 32 are inserted within and engaged with workpiece 60. Workpiece 60 may include a lower surface 64 that is opposite the upper surface 62, and the pin 30 and flange 32 may be inserted within workpiece 60 such that flange 32 is positioned between the upper surface 62 and lower surface 64. As a result, the upper surface 40 of flange 32 may act as an additional shoulder that is spaced from shoulder 20 along axis 15 and that bears against the material of the workpiece 60 during operations.

As the tool 10 is rotated about axis 15, the tool 10 is moved in a radial direction with respect to axis 15 along the workpiece 60 (e.g., parallel with upper surface 62). As a result, during operations, the axis 15 is oriented perpendicularly or normally to the upper surface 62 of workpiece 60; however, it should be appreciated that axis 15 may not be perpendicular to the upper surface 62 of workpiece 60 in some embodiments.

The material forming workpiece 60 is heated by the frictional engagement of shoulder 20, pin 30, and flange 32 so that the material of workpiece 50 softens and opens to allow progression of the tool 10 (particularly pin 30 and flange 32) into the workpiece 60. In addition, as the tool 10 advances through workpiece 60 in the radial direction, the softened material of workpiece 60 may flow around the pin 30 and flange 32, between the shoulder 20 and upper surface 40 of flange 32 to re-close the opening behind the tool 10 (with respect to the direction of travel of the tool 10), thereby leaving a region of deformed material 55. However, as the tool 10 progresses radially across the workpiece 60, the material may not re-fill the cavity formed by flange 32, so that channel 50 is formed within the deformed material 55. During these operations, the material of workpiece 60 within the deformed region 55 may be pinched and compressed between the shoulder 20 and upper surface 40 of flange 32 in the axial direction with respect to axis 15.

Within the deformed region 55, the frictional engagement of the shoulder 20, pin 30, and flange 32 may refine the metallurgical grain size of the material of workpiece 60, such that the deformed region 55 may be strengthened adjacent the internal channel 50 relative to the properties of the bulk material of workpiece 60. In some embodiments, deformed region 55 may have an average metallurgical grain size which is between about 25% and about 75% smaller than an average metallurgical grain size within workpiece 60, outside of deformed region 55.

It should also be appreciated that the internal channel 50 formed using tool 10 may be seamless, such that the channel is free of seams that are generally parallel to the longitudinal axis of the channel. Such seams may be expected in channels formed by, for example, joining two separate workpieces (whereby the channel is formed along the line of engagement between the two workpieces).

In some embodiments, the channel 50 may be non-linear or may include non-linear (e.g., curved) sections or portions. In particular, the tool 10 may be moved along workpiece 60 in a plane that is radial to the axis 15 along a non-linear (e.g., curved) path to thereby result in a non-linear channel 50.

Referring now to FIGS. 3-8, in some embodiments, tool body 14 may include a plurality of facets 16 formed thereon. During operations, teeth or other features on the rotational driver 12 (FIGS. 1 and 2) may engage with facets 16 to drive rotation of tool body 14 about axis 15.

In addition, in some embodiments shoulder 20 may include a number of shapes, contours, or other features. For instance, in some embodiments, shoulder 20 may comprise a plurality of first or inner spiral grooves 22, and a plurality of second or outer spiral grooves 24. As best shown in FIG. 5, a threaded bore 26 extends axially into tool body 14 from lower end 14b along axis 15. Threaded bore 26 threadably receives pin 30 therein during operations. The outer spiral grooves 24 may extend to the radially outer edge of shoulder 20, and inner spiral grooves 22 may be positioned radially inside of outer spiral grooves 24. The inner spiral grooves 22 may spiral toward the axis 15 in a first direction, and the outer spiral grooves 24 may spiral toward the axis 15 in a second direction that is opposite the first direction.

Figure 3:
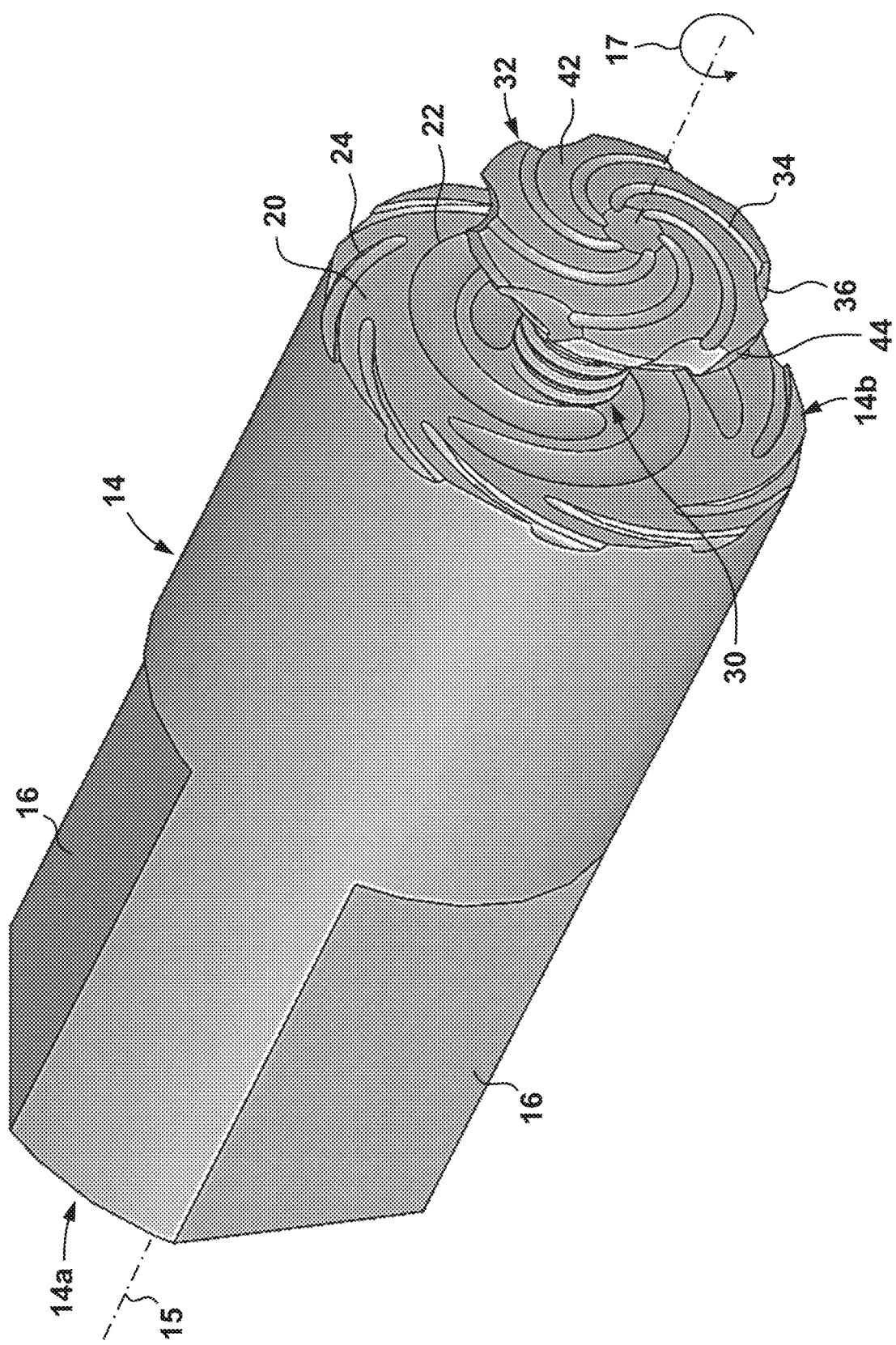
FIGS. 3 and 4 are perspective views of a tool that may be used to perform the friction stir processing operation of FIG. 1 according to some embodiments.
Figure 4:
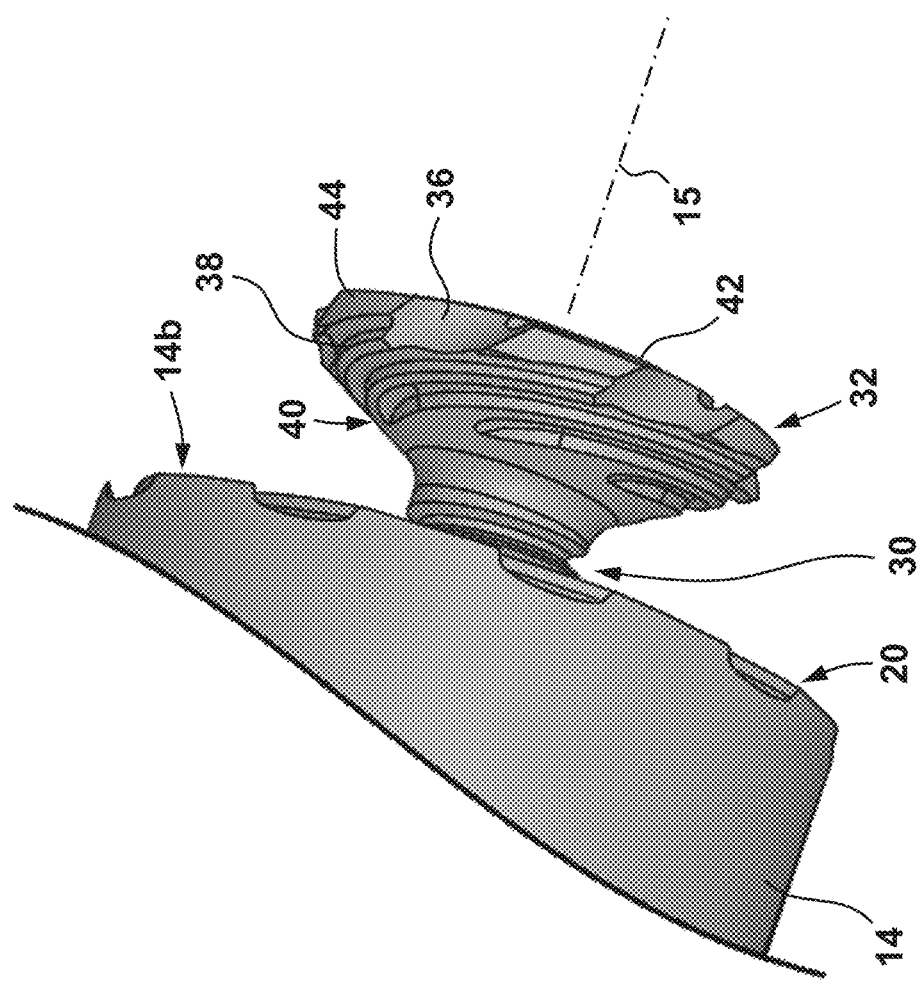

Referring still to FIGS. 3-8, pin 30 and flange 32 may also may include a number of shapes, contours, or other features. For instance, lower surface 42 of flange 32 includes a plurality of spiral grooves 34 that spiral away from the central axis 15 along the same direction as the plurality of inner grooves 22 on shoulder 20 (e.g., along the "first direction" as noted above). The radially outer surface 44 includes a plurality of radially extending notches or recesses 36. Each notch 36 may align with one of the grooves 34. As best shown in FIGS. 4 and 8, the upper surface 40 of flange 32 may also include a plurality of spiral grooves 38 that spiral in toward the axis 15 along a direction that is opposite the first direction of the spiral grooves 34. Thus, the spiral grooves 38 may spiral into the axis 15 along the same direction as the outer spiral grooves 24 on shoulder 20 (e.g., along the "second direction" as noted above). In some embodiments, the upper surface 40 of flange 32 is frusto-conical in shape. As a result, the spiral grooves 38 may each extend along a conical helix path. In addition, each notch 36 may also align with one of the grooves 38.

Pin 30 may comprise a helical thread 31 that may threadably engage within the threaded bore 26 in shoulder 20 to connect the pin 30 and flange 32 to tool body 14. In some embodiments, pin 30 and flange 32 may be formed of one monolithic one-piece body (e.g., via casting, molding, machining, or other suitable process(es)). In some embodiments, the axial length of pin 30 from the shoulder 20, and thus the axial distance between shoulder 20 and flange 32 may be adjustable (e.g., via a linear actuator, threaded engagement or disengagement of pin 30 in bore 26) so as to adjust a depth of the channel 50 within the workpiece 60 during operations.

In some embodiments, flange 32 may be selectively expanded or extended during operations so as to vary a size and shape of the channel 50 during operations. For instance, flange 32 may be axially expanded (e.g., at or along lower surface 42 and/or upper surface 40) to increase an axial length of flange 32 during operations. In some embodiments, flange 32 may be expandable in a radial direction (e.g., at or along radially outer surface 44) during operations. For instance, in some embodiments the flange 32 may comprise a plurality of axially extending segments that are circumferentially spaced about axis 15. The segments may be rearranged (and/or replaced) to selectively increase or decrease a radial width (e.g., radial width $W_{32}$ in FIG. 2) during operations. Without being limited to this or any other theory, the axial and/or radial expansion of flange 32 may allow the formation of a channel 50 with varying cross-sectional area.

During the operations described above to form channel 50 within workpiece 60 (FIGS. 1 and 2), the interaction of the notches 36 and spiral grooves 22, 24, 34, 38 with the material forming the workpiece 60 may cause the material of the workpiece 60 to flow around the shoulder 20, pin 30, and flange 32 to form the channel 50 as generally described above. Specifically, as shown in FIG. 3, the tool body 14 may be configured to rotate about axis 15 in a direction 17 that is generally aligned with the directions of spiral grooves 22, 34 and opposite the directions of spiral grooves 24, 38.

During operations, the directions of the spiral grooves 34 on lower surface 42 of flange 32 may move material of the workpiece 60 away from central axis 15, and the spiral grooves 38 on upper surface 40 may move material of workpiece 60 axially away from flange 32 and toward shoulder 20 so as to form channel 50 when tool 10 is rotated about axis 15 in direction 17. In addition, the direction of the helical thread 31 on pin 30 may also act to move material of the workpiece 60 axially away from flange 32 to facilitate formation of channel 50 as tool 10 is rotated about axis 15 in direction 17.

More particularly, grooves 34 are oriented such that when the tool is rotated in direction 17, material of deformed region 55 tends to move outward radially along surface 42 towards outer surface 44. Recesses 36 may then direct the material toward surface 40, where grooves 38 direct the material toward threads 30. Thereafter, threads 30 tend to promote a continuation of flow of material toward shoulder 20, where grooves 22 engage the material to move it radially outward away from pin 30. This general path of material flow promotes the evacuation of material of deformed region 55 to form channel 50. Finally, during rotation of tool 10 in direction 17, grooves 24 tend to oppose grooves 22 to contain the material along the outer periphery of shoulder 20 to help consolidate the material in the upper portion of channel 50 and thereby close and seal the outer surface of channel 50.

Figure 9:
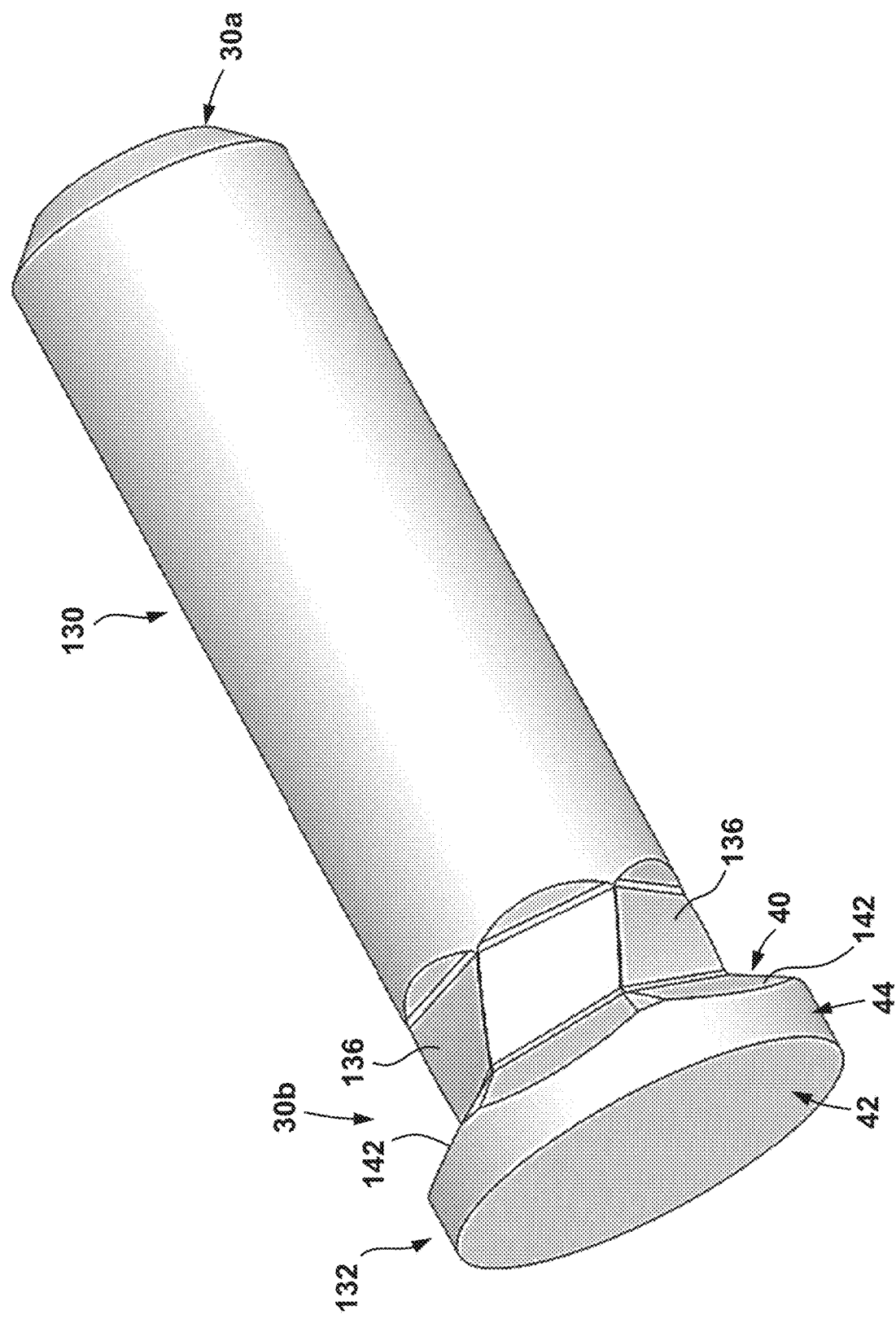
FIGS. 9, 10, and 11 are perspective views of pins and flanges that may be used with the tool of FIGS. 3 and 4 according to some embodiments.

Referring now to FIG. 9, an embodiment of a pin 130 and flange 132 is shown that may be used with tool body 14 in some embodiments. In describing the features of pin 130 and flange 132, like reference numerals will be used to identify parts of pin 130 and flange 132 that are shared with the pin 30 and flange 32 described above. Moreover, the focus of the following description will be on the features of pin 130 and flange 132 that are different from pin 30 and flange 32, respectively.

In particular, pin 130 includes a plurality of circumferentially adjacent, parallel helicoidal surfaces 136 extending from upper surface 40 of flange 132, toward upper end 30a. As shown in FIG. 9, the helicoidal surfaces 136 may not extend fully to upper end 30a and may terminate at a point positioned axially between upper end 30a and lower end 30b.

In addition, upper surface 40 of flange 132 includes a plurality of facets 142 that extend from pin 132 to the radially outer surface 44. As shown in FIG. 9, in some embodiments, the radially outer surface 44 may be cylindrical in shape, and the lower surface 42 may be planar or flat; however, any suitable shape or features may be included on these surfaces in various embodiments (e.g., notches 36, grooves 34). As is also shown in FIG. 9, each of the facets 142 is aligned with a corresponding one of the helicoidal surfaces 136 at the interface of the pin 130 and upper surface 40 of flange 132.

Figure 10:
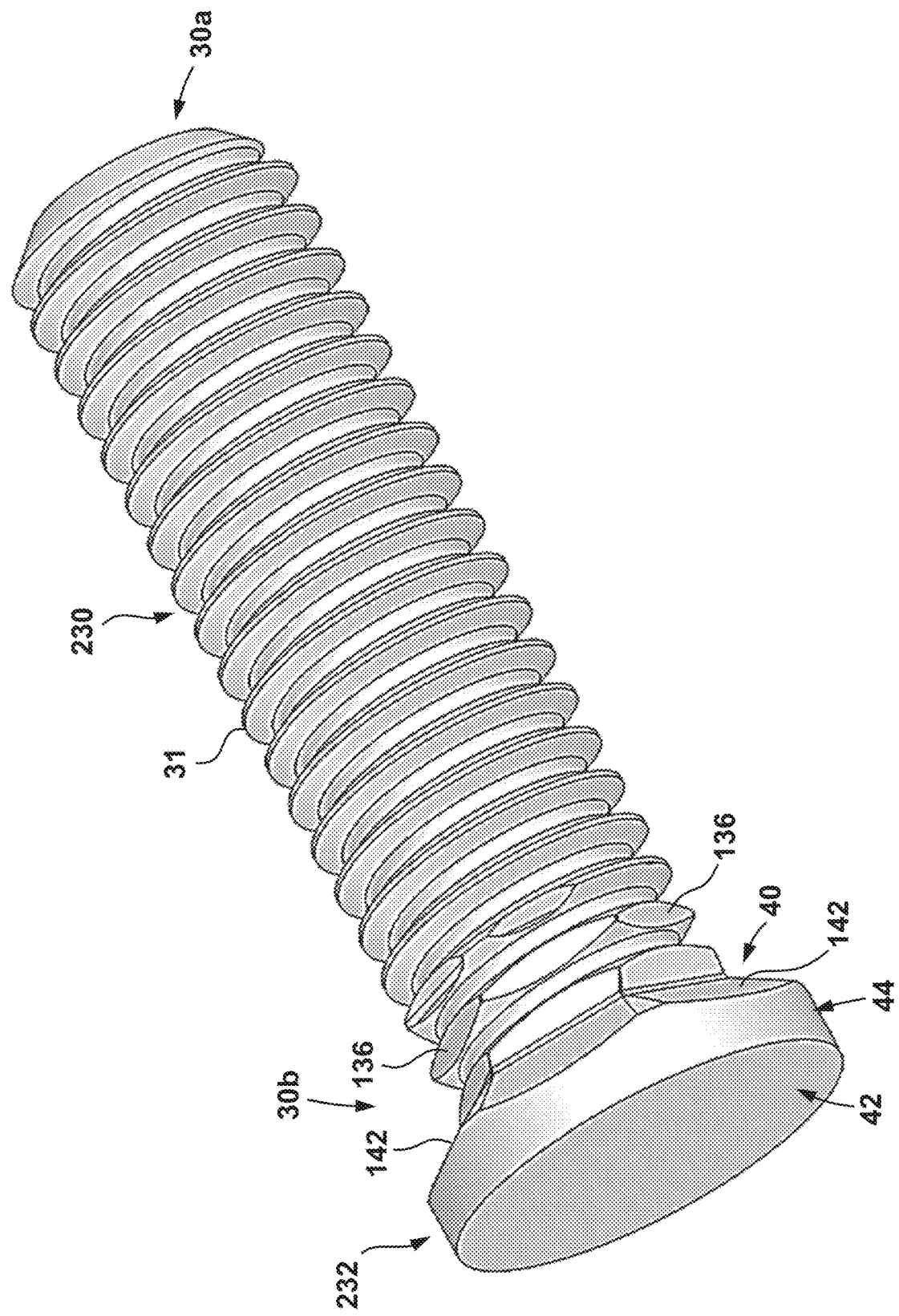

Referring now to FIG. 10, another embodiment of a pin 230 and flange 232 is shown that may be used with tool body 14 in some embodiments. Generally speaking, pin 230 and flange 232 are generally the same as the pin 130 and flange 132 shown in FIG. 9 and described above, except that pin 230 includes the thread 31 that was previously described above for pin 30 (FIGS. 7 and 8). The thread 31 may extend through the helicoidal surfaces 136.

Figure 11:
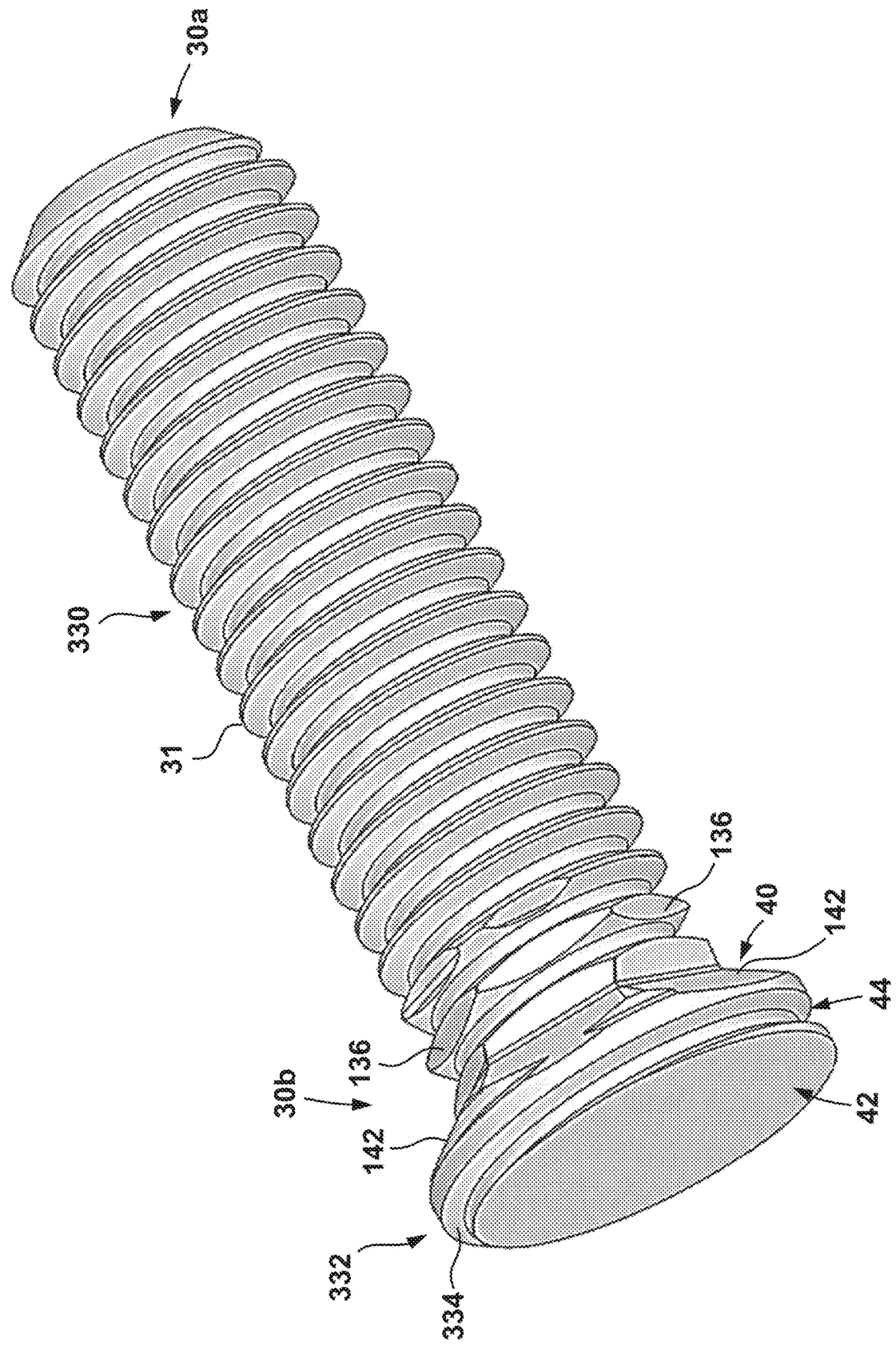

Referring now to FIG. 11, another embodiment of pin 330 and flange 332 is shown that may be used with tool body 14 in some embodiments. Generally speaking, pin 330 and flange 332 are generally the same as the pin 230 and flange 232 shown in FIG. 10 and described above, except that radially outer surface 44 of flange 332 include an additional helical thread 334 that extends between upper surface 40 and lower surface 42.

Figure 12:
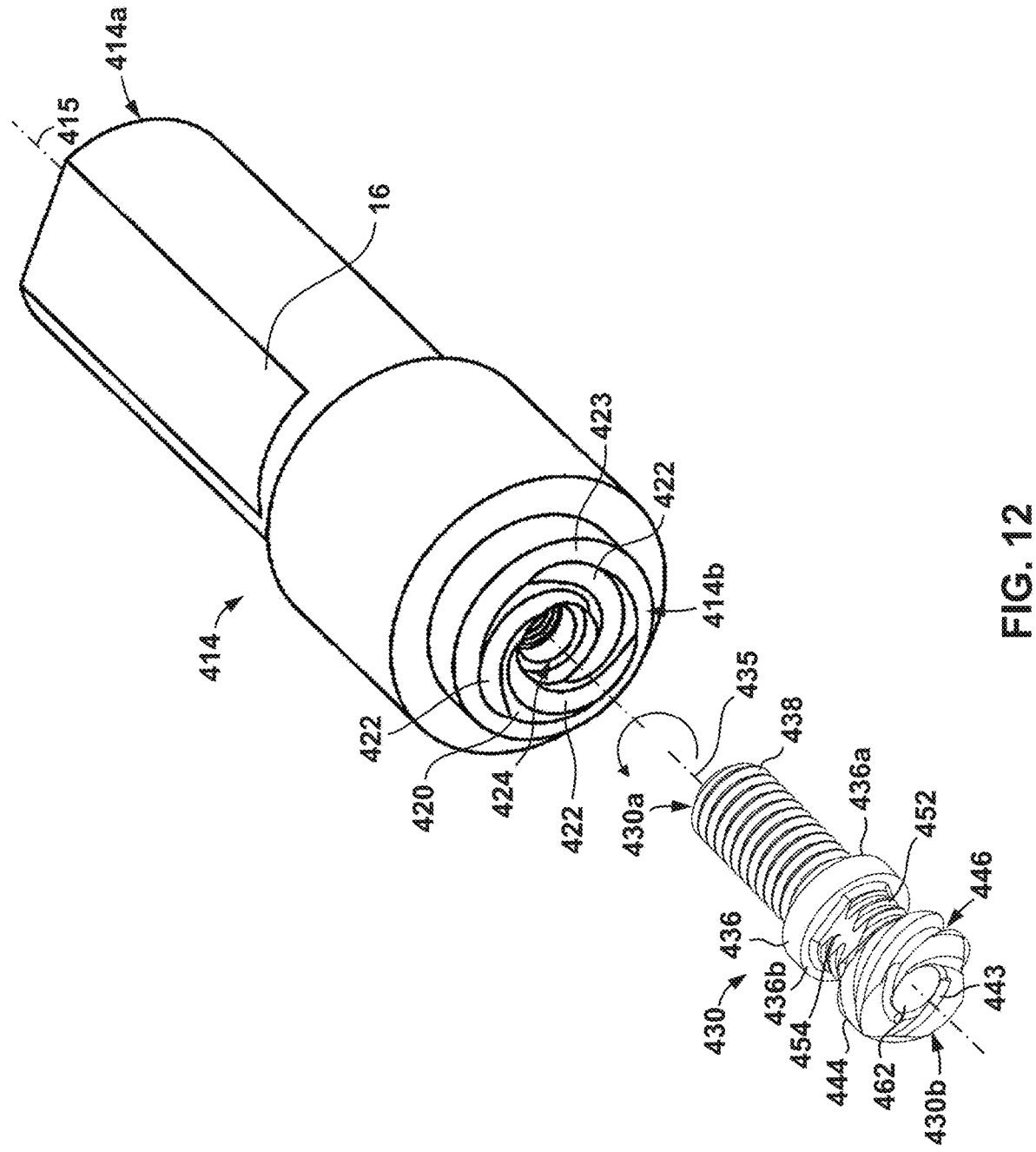
FIG. 12 is an exploded perspective view of a tool that may be used to perform the friction stir processing operations of FIG. 1 according to some embodiments.
Figure 13:
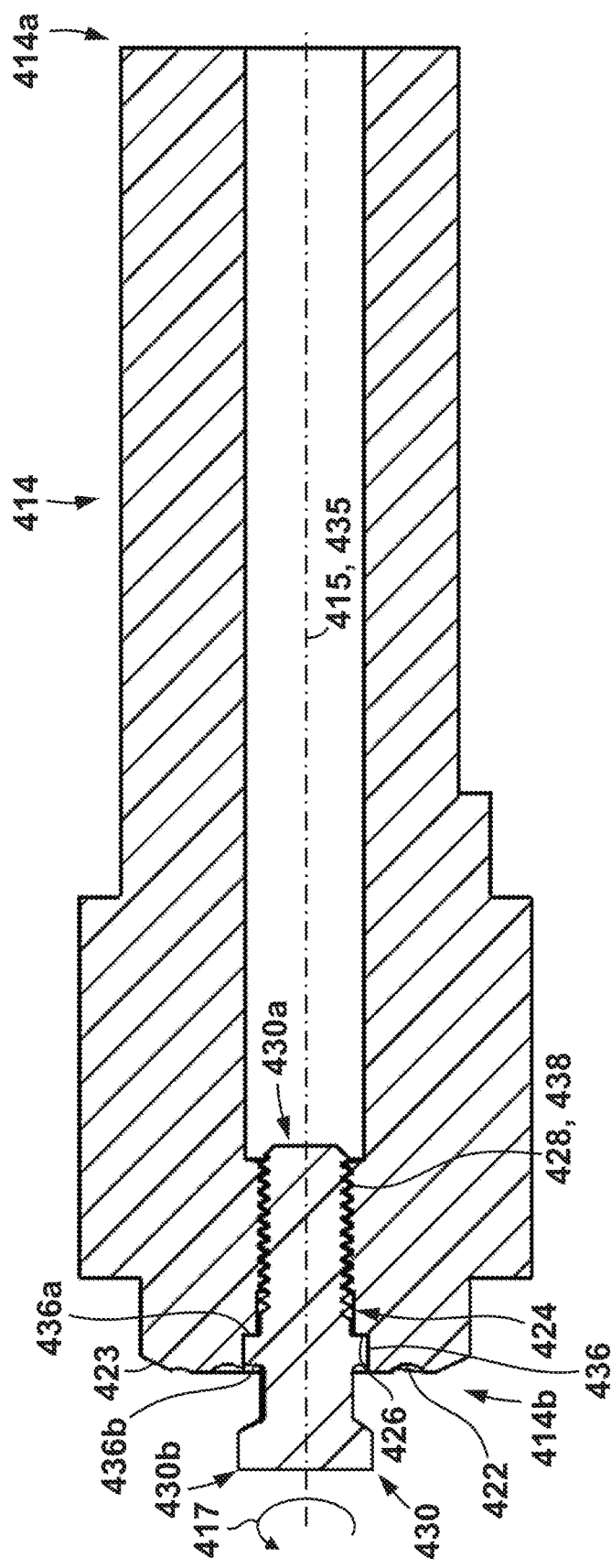
FIG. 13 is a side cross-sectional view of the tool of FIG. 12 according to some embodiments.

Referring now to FIGS. 12 and 13, an embodiment of a tool is shown that may be used in place of tool of FIGS. 1 and 2 for carrying out a friction stir processing operation according to some embodiments. Specifically, the tool of FIGS. 12 and 13 includes a tool body 414 and pin 430 that may be used in place of tool body 14 and pin 30, respectively, to form channel 50 in FIGS. 1 and 2 according to some embodiments.

Figure 14:
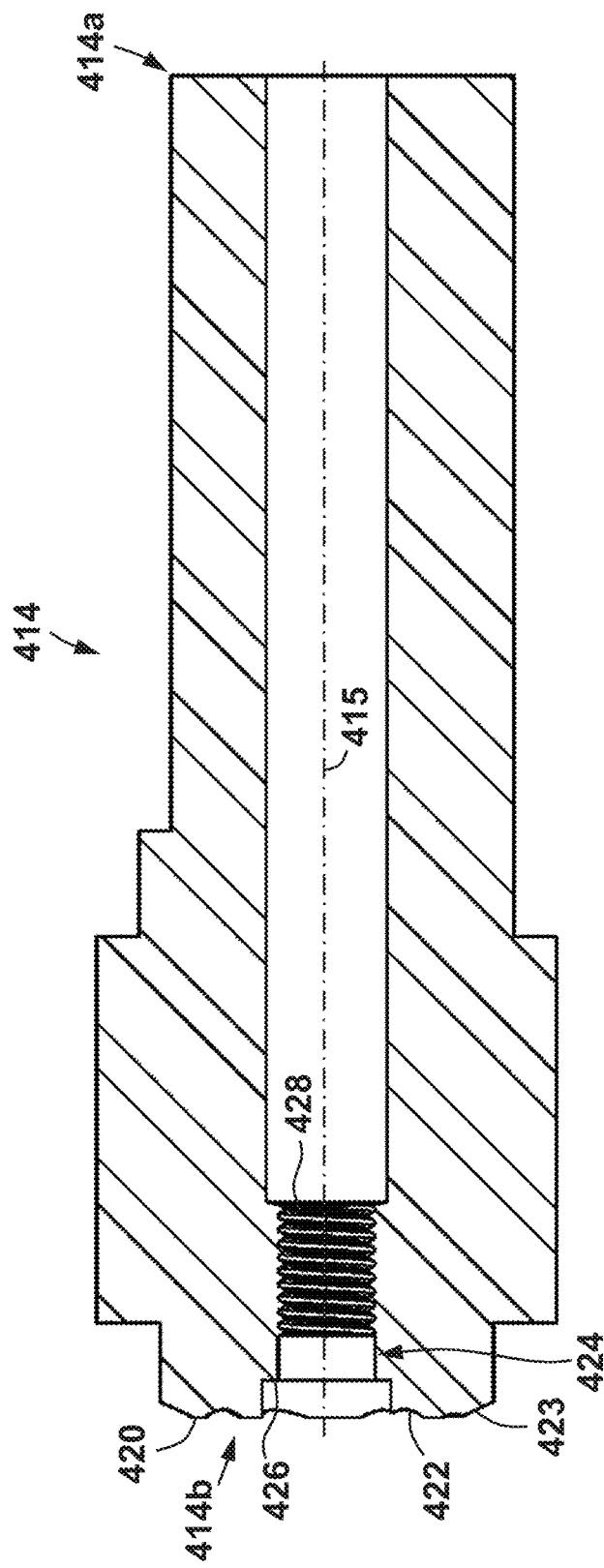
FIG. 14 is a side cross-sectional view of a tool body of the tool of FIG. 12 according to some embodiments.

Referring now to FIGS. 12-14, the tool body 414 includes a central, longitudinal axis 415. During operations, tool body 414 is rotated about axis 415 in a rotational direction 417 (e.g., a counter clockwise direction when viewing tool body 414 from lower end 414b along axis 415) while engaging tool body 414 and pin 430 with workpiece 60 so as to form a deformed region 55 within the workpiece 60 that includes the internal channel 50 as previously described (FIG. 1). Tool body 414 includes a first or upper end 414a and a second or lower end 414b opposite upper end 414a. In addition, tool body 414 may include a plurality of facets 16 formed thereon as previously described above for tool body 14 (FIG. 3).

A radially extending shoulder 420 is defined on lower end 414b. Shoulder 420 may include a number of configurations and shapes in various embodiments such as, flat, tapered, convex, concave, etc. Shoulder 420 may be referred to herein as an "inner flange" of tool 10 (FIG. 1). In some embodiments, the shoulder 420 may comprise a planar, radially oriented (or extending) surface. A frustoconical surface or chamfer 423 may extend circumferentially about shoulder 420 with respect to axis 415.

A bore 424 extends axially into shoulder 420 at lower end 414b along axis 415. As best shown in FIG. 14, bore 424 includes an annular shoulder 426 that extends circumferentially about axis 415, and a set of threads 428 axially spaced from shoulder 426. The annular shoulder 426 may be spaced axially between the shoulder 420 (and lower end 414b) and the threads 428. Because bore 424 includes threads 428 it may be referred to herein as a "threaded bore."

Figure 15:
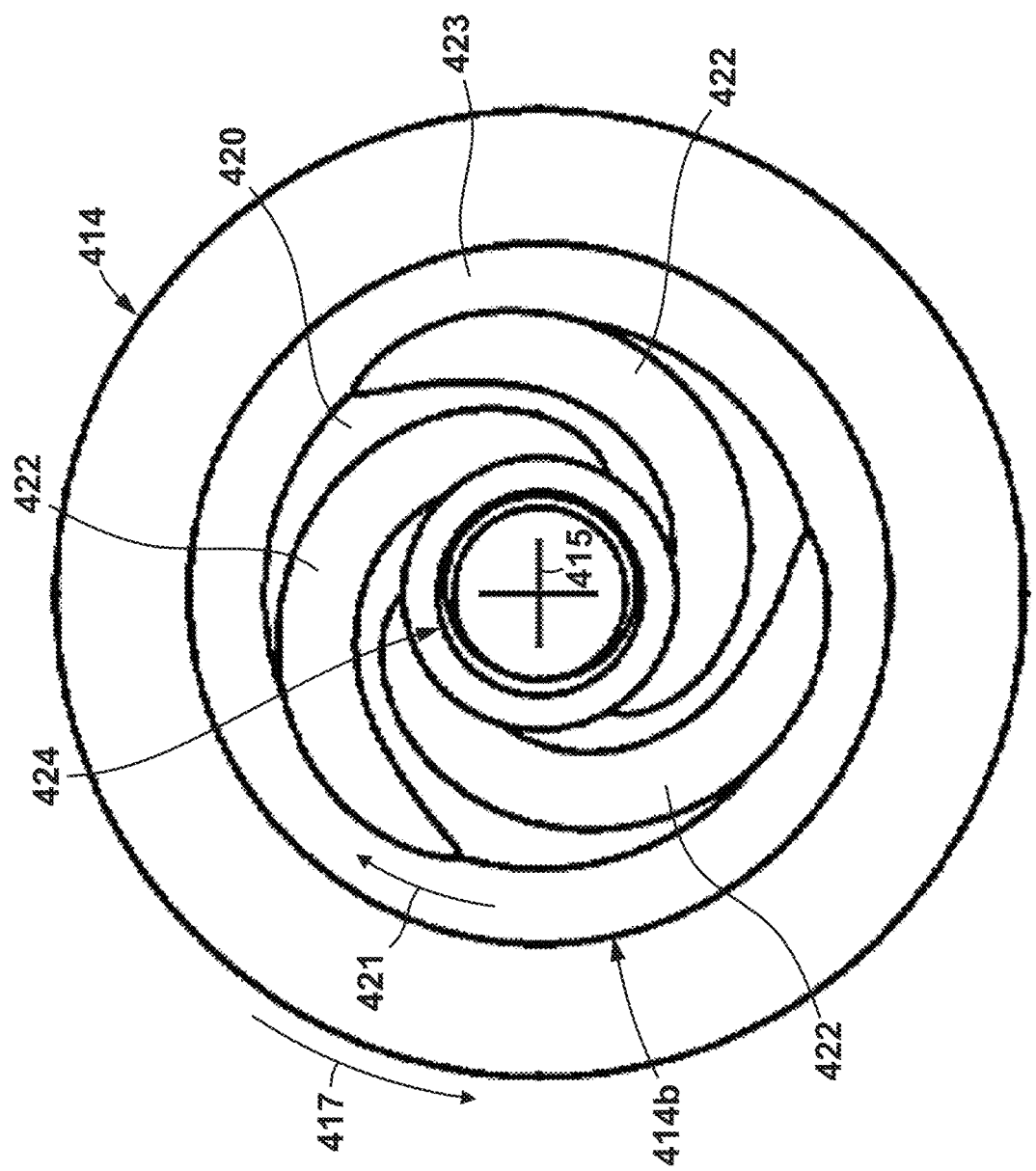
FIG. 15 is an end view of the tool body of FIG. 14 according to some embodiments.
Figure 16:
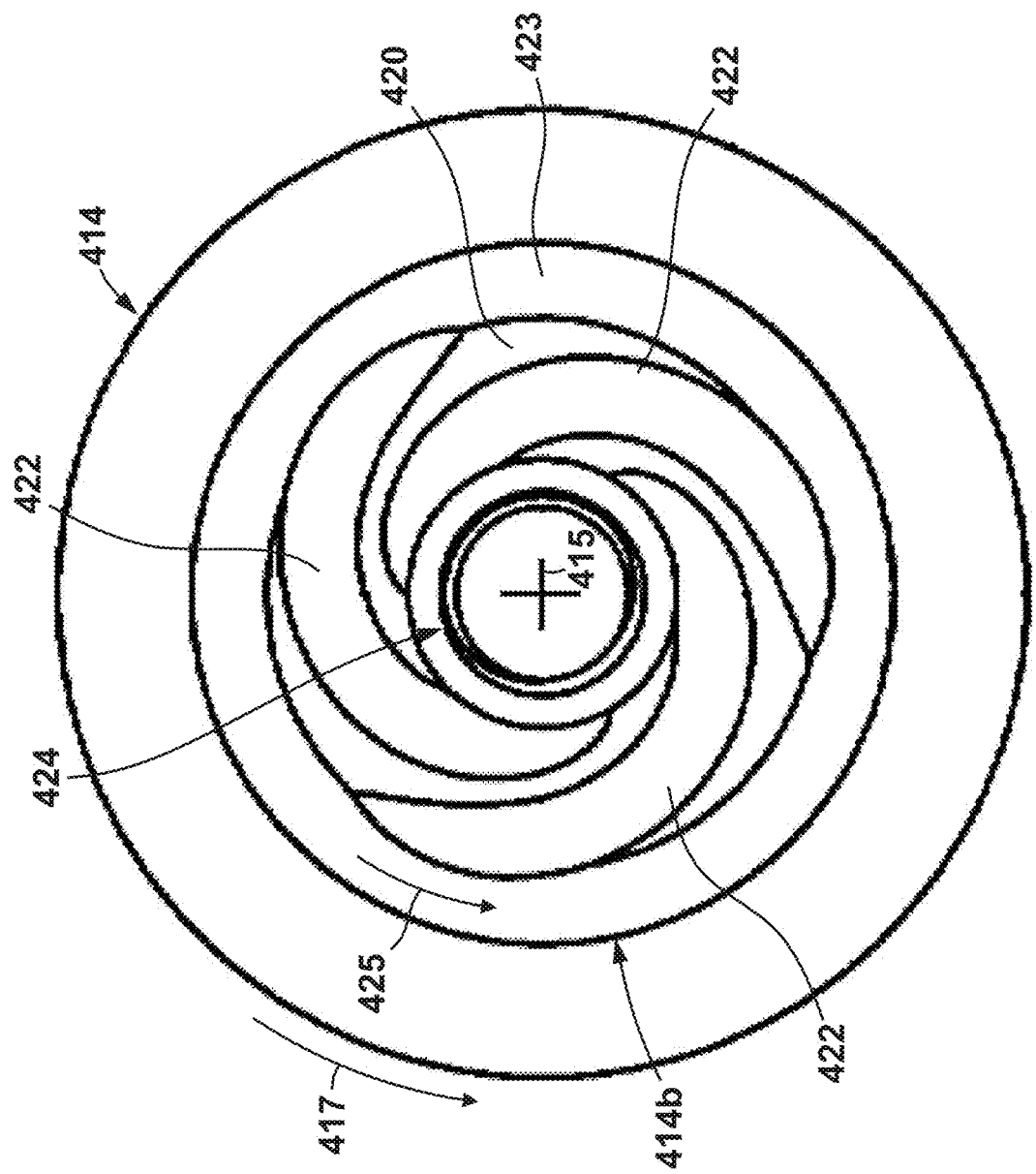
FIG. 16 is an end view of the tool body of FIG. 14 according to some embodiments.

Referring now to FIGS. 12 and 15, shoulder 420 may comprise a plurality of spiral grooves 422. As best shown in FIG. 15, the outer spiral grooves 422 may extend from the frustoconical surface 423 (and therefore from the radially outer edge of shoulder 420) across shoulder 420 to the bore 424. In some embodiments (e.g., such as in the embodiment of FIGS. 12 and 15), the spiral grooves 422 may spiral radially inward toward the axis 415 from frustoconical surface 423 along a circumferential direction 421 that is opposite from the rotational direction 417 of tool body 414. Referring briefly to FIG. 16, in some embodiments, the spiral grooves 422 may spiral radially inward toward the axis 415 from frustoconical surface 423 along a circumferential direction 425 that is aligned with (or the same as) the rotational direction 417 of tool body 414.

Referring again to FIGS. 12 and 13, pin 430 is threadably coupled to tool body 414. Specifically, pin 430 is threadably engaged with threads 428 within bore 424 such that pin 430 extends along axis 415 during operations.

Referring now to FIGS. 17 and 18, pin 430 includes a central or longitudinal axis 435, a first or upper end 430a, and a second or lower end 430b opposite upper end 430a. An outer flange 432 is formed on lower end 430b. In addition, threads 438 extend helically about pin 430 (with respect to axis 435) from upper end 430a. Further, an annular shoulder 436 is positioned axially between flange 432 and threads 438 along axis 435. The annular shoulder 436 may include a first or upper radial surface 436a and a second or lower radial surface 436b axially spaced from upper radial surface 436a. The lower radial surface 436b is positioned axially between flange 432 and upper radial surface 436a with respect to axis 435.

Flange 432 includes a first or upper surface 440, a second or lower surface 442, and a radially outer surface 444 extending axially between upper surface 440 and lower surface 442. The lower surface 442 may be planar and may extend radially with respect to axis 435. Conversely, the upper surface 440 may be frustoconical or convexly curved, but may generally extend inward toward axis 435 from (or proximate to) radially outer surface 444.

Figure 19:
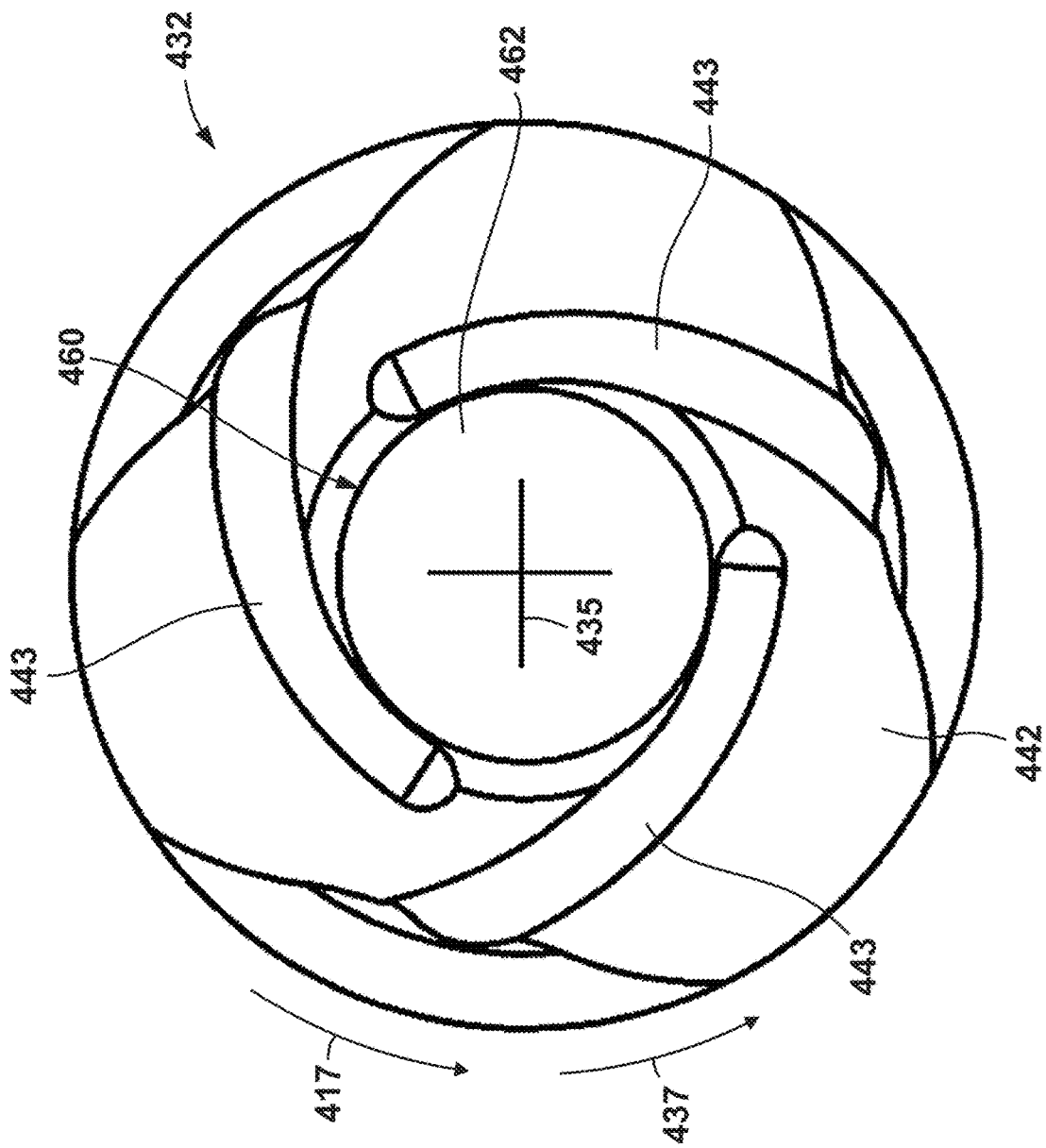
FIG. 19 is an end view of the pin of FIG. 17 according to some embodiments.

Referring now to FIG. 19, a recess 460 extends axially inward along axis 435 from lower surface 442. The recess 460 terminates at a planar, radially extending surface 462 that is axially recessed into lower end 430b and lower surface 442 along axis 435. In addition, a plurality of spiral grooves 443 extend radially inward (or toward axis 435) from radially outer surface 444 toward recess 460. The spiral grooves 443 spiral radially inward toward the central axis 435 and the recess 460 along a circumferential direction 437 that is aligned with (or the same as) the as the rotational direction 417. During operations, the recess 460 may collect softened material of the workpiece (e.g., workpiece 60) that is then directed radially outward from the recess 460 toward radially outer surface 444 via the plurality of spiral grooves 443.

Referring back to FIGS. 17 and 18, a plurality of helical grooves 446 are formed in the radially outer surface 444. Generally speaking, the helical grooves 446 may each extend in a clockwise direction about axis 435 as the helical grooves 446 advance axially from the lower surface 442 to the upper surface 440 and when pin 430 is viewed along axis 435 from lower end 430b. Stated differently, the helical grooves 446 may extend circumferentially about axis 435 along a circumferential direction that is opposite the rotational direction 417 when moving axially from lower surface 442 to upper surface 440.

An additional helical groove 452 extends about pin 430 axially from upper surface 440 to annular shoulder 436. The helical groove 452 may extend in the same direction as the helical grooves 446. Thus, the helical groove 452 may extend circumferentially about axis 435 along a circumferential direction that is opposite the rotational direction 417 when moving axially from upper surface 440 to annular shoulder 436.

Referring now to FIGS. 12 and 17, a plurality of flats or facets 454 are formed on pin 430 axially between upper surface 440 of flange 432 and annular shoulder 436. Thus, the flats 454 may extend through and interfere with the helical groove 452. The plurality of flats 454 may be uniformly circumferentially spaced about axis 435. The flats 454 may comprise planar surfaces that extend axially between upper surface 440 of flange 432 and annular shoulder 436. Thus, in some embodiments (e.g., such as the embodiment of FIGS. 12 and 17), there are a total of three (3) flats 454 that are spaced approximately 120° apart from one another about axis 435. However, there may be different numbers of flats 454 in other embodiments (e.g., such as two flats 454 spaced approximately 180° apart about axis 435, four flats 454 spaced approximately 90° apart about axis 435, etc.).

Referring again to FIGS. 12 and 13, threads 438 are engaged with threads 428 within recess 424 on tool body 414 so that central axis 435 is aligned (and is co-axial with) central axis 415. Threaded advancement of pin 430 into recess 424 proceeds until annular shoulder 436 on pin 430 engages or abuts with the annular shoulder 426 within recess 424. Specifically, the upper radial surface 436a of annular shoulder 436 engages or abuts with annular shoulder 426 within recess 424. In some embodiments, the lower radial surface 436b of annular shoulder 436 is flush or co-planar with shoulder 420 on tool body 414. Conversely, in some embodiments, the lower radial surface 436b of annular shoulder 436 is recessed axially within (or axially projected from) shoulder 420 on tool body 414 along axes 415, 435.

Without being limited to this or any other theory, the engagement between annular shoulder 436 on pin 430 and the annular shoulder 426 within recess 424 may reduce a tension borne by the threads 438, 428. Thus, the positive engagement between annular shoulders 436, 426 may prevent or reduce shearing of the threads 426, 436 even when relatively high torsion loads are transferred to the pin 430 and/or tool body 414 during the friction stir welding operations described herein.

Referring now to FIGS. 1, 2, 12, and 13, during operations rotational driver 12 is engaged with tool body 414 as previously described. Thereafter the tool body 414 and pin 430 are rotated about the aligned axes 415, 435 via the rotational driver 12 in the rotational direction 417. The rotating tool body 414 and pin 430 are then engaged with the workpiece 60 to form the region of deformed material 55 and the channel 50 as previously described. More particularly, the rotating tool body 414 and pin 430 are traversed across workpiece 60 in a radial direction with respect to the axes 415, 435, while the flange 432 of pin 430 is positioned between the upper surface 62 and lower surface 64 of workpiece 60.

The interaction of spiral grooves 443, 422, helical grooves 446, 452, and flats 454 with the material forming the workpiece 60 may cause the material of the workpiece 60 to flow around shoulder 420, pin 430, and flange 432 to form channel 50 as previously described. Specifically, the directions of spiral grooves 443 and helical grooves 446, 452 relative to rotational direction 417 may move material of the workpiece 60 radially outward from axes 435, 415 along lower surface 442 of flange 432 and axially upward along radially outer surface 444 and pin 430 toward lower surface 436b of annular shoulder 436. Thereafter, the material of workpiece 60 may interact with the spiral grooves 422 formed on shoulder 420 of tool body 414. Referring briefly again to FIG. 15, for embodiments having spiral grooves 422 spiraling radially inward toward axis 415 along the circumferential direction 421, the material may be restricted from moving radially outward from shoulder 420 via the spiral grooves 422 so that the captured or retained material may better seal the upper end of channel 50 (e.g., along the upper surface 62 of workpiece 60). Referring briefly again to FIG. 16, for embodiments having spiral grooves 422 spiraling radially inward toward axis 415 along the circumferential direction 425, the material of the workpiece 60 may be directed radially outward or away from the axes 415, 435 along shoulder 420. The choice between the two directions (e.g., circumferential directions 421, 425) of spiral grooves 422 shown in FIGS. 15 and 16 may be made based on a variety of factors such as, for instance the material forming workpiece 60, the speed of rotation (e.g., along rotational direction 417), the speed of the radial movement of the tool body 414 and pin 430, etc.

Figure 20:
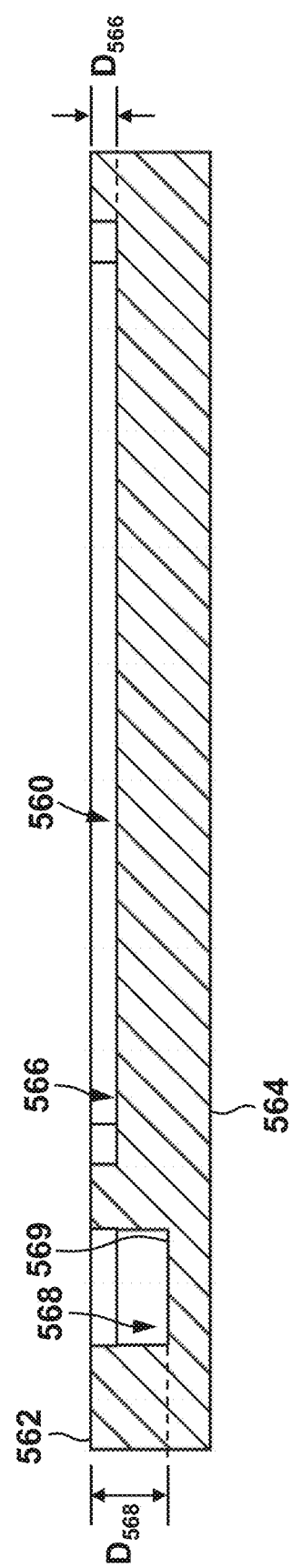
FIG. 20 is a cross-sectional view of a workpiece that may undergo the friction stir processing operation of FIG. 1 according to some embodiments.

Referring now to FIG. 20, an embodiment of workpiece 560 that may serve as the workpiece 60 shown in FIGS. 1 and 2 is shown. In some embodiments, workpiece 560 may be pre-worked, formed, milled, etc. in order to facilitate the formation of channel 50 (FIGS. 1 and 2). As with workpiece 60, workpiece 560 may include a first or upper surface 562, and a second or lower surface 564 opposite upper surface 562. A groove 566 may be cut or milled into the upper surface 562 that is extends part-way through the workpiece 560 (i.e., the groove 566 may not extend completely through to the lower surface 564). The groove 566 may extend to a depth $D_{566}$ measured perpendicularly from the upper surface 562. In some embodiments, the groove 566 may extend less than half-way through thickness of the workpiece 560 (i.e., the depth $D_{566}$ is less than half the total distance between the upper surface 562 and lower surface 564), or less than a third of the way through the thickness of the workpiece 560 (i.e., the depth $D_{566}$ is less than a third of the total distance between the upper surface 562 and lower surface 564). In some embodiments, the depth $D_{566}$ of the groove 566 may have a magnitude that is equal to or less than the axial distance between the upper surface 440 and the lower radial surface 436b (FIGS. 17 and 18). The groove 566 may define the path of the eventual internal channel (e.g., channel 50 in FIGS. 1 and 2) that is to be formed in workpiece 560 via interaction with tool 10 as previously described.

In addition, a recess 568 extends into workpiece 560 from upper surface 562 that is adjacent the groove 566. In some embodiments, recess 568 may be spaced from groove 566 (e.g., such as shown in FIG. 20). However, in some embodiments, recess 568 may be contiguous with groove 566. Like the groove 566, the recess 568 extends part-way through the workpiece 560. The recess 568 may extend to a depth $D_{568}$ measured perpendicularly from the upper surface 562. The depth $D_{568}$ may define a maximum depth of the internal channel that may be formed by interaction of the tool 10 with the workpiece 560 (channel 50 in FIGS. 1 and 2). The depth $D_{568}$ may be greater than the depth $D_{566}$.

Referring now to FIGS. 1, 2, and 20, during operations for forming an internal channel 50 within workpiece 560, the flange 32 of tool 10 may be inserted into the recess 568 and then rotated about axis 15. The depth $D_{568}$ of recess 568 may be such that the shoulder 20 of tool 10 is separated from the upper surface 562 of workpiece 560 when the flange 32 is initially inserted within recess 568 and engaged with a terminal surface 569 therein. However, after tool 10 reaches a suitable rotational speed, the flange 32 maybe plunged slightly into the terminal surface 569 of the recess 568 so that shoulder 20 brought into contact with upper surface 562. In some embodiments, the tool 10 is rotated in place about axis 15 after initial contact is formed between shoulder 20 and the upper surface 562. When tool 10 engages with the workpiece 560, the local temperature within the workpiece 560 surrounding tool 10 may increase to form a so-called "thermal plume" within workpiece 560 about the tool 10. The thermal plume may allow for flow or movement of material via interaction with tool 10 (including flange 32 and shoulder 20) as previously described. Once a sufficient thermal plume is initiated, the rotating tool 10 may be traversed (e.g., radially with respect to axis 15) along the line of groove 566 to thereby form an internal channel 50.

Without being limited to this or any other theory, the groove 566 may provide sufficient open space along upper surface 562 to allow material of workpiece 560 that is displaced by pin 30 (including flange 32) and shoulder 20 to form a top or ceiling of the channel 50 along upper surface 562. Thus, the groove 566 may be placed along workpiece 560 for all or most of the length of channel 50 in some embodiments.

Referring still to FIGS. 1 and 2, during the above-described operations to form an internal channel 50 within a workpiece 60, the travel speed of the tool 10 through the workpiece 60 may be adjusted throughout the process to ensure formation of a sealed internal channel 50. As previously described, when tool 10 engages with the workpiece the local temperature within the workpiece surrounding the tool 10 may increase to form a thermal plume to facilitate movement of the material forming the workpiece about the tool 10 as previously described. Thus, at the initial stages of the friction stir processing operation to form the internal channel (e.g., channel 50), the travel speed of the tool 10 through the workpiece 60 may be progressively increased from a relatively low speed to a final target speed so as to first establish and thereafter maintain the thermal plume around the tool 10 within the workpiece 60.

Figure 21:
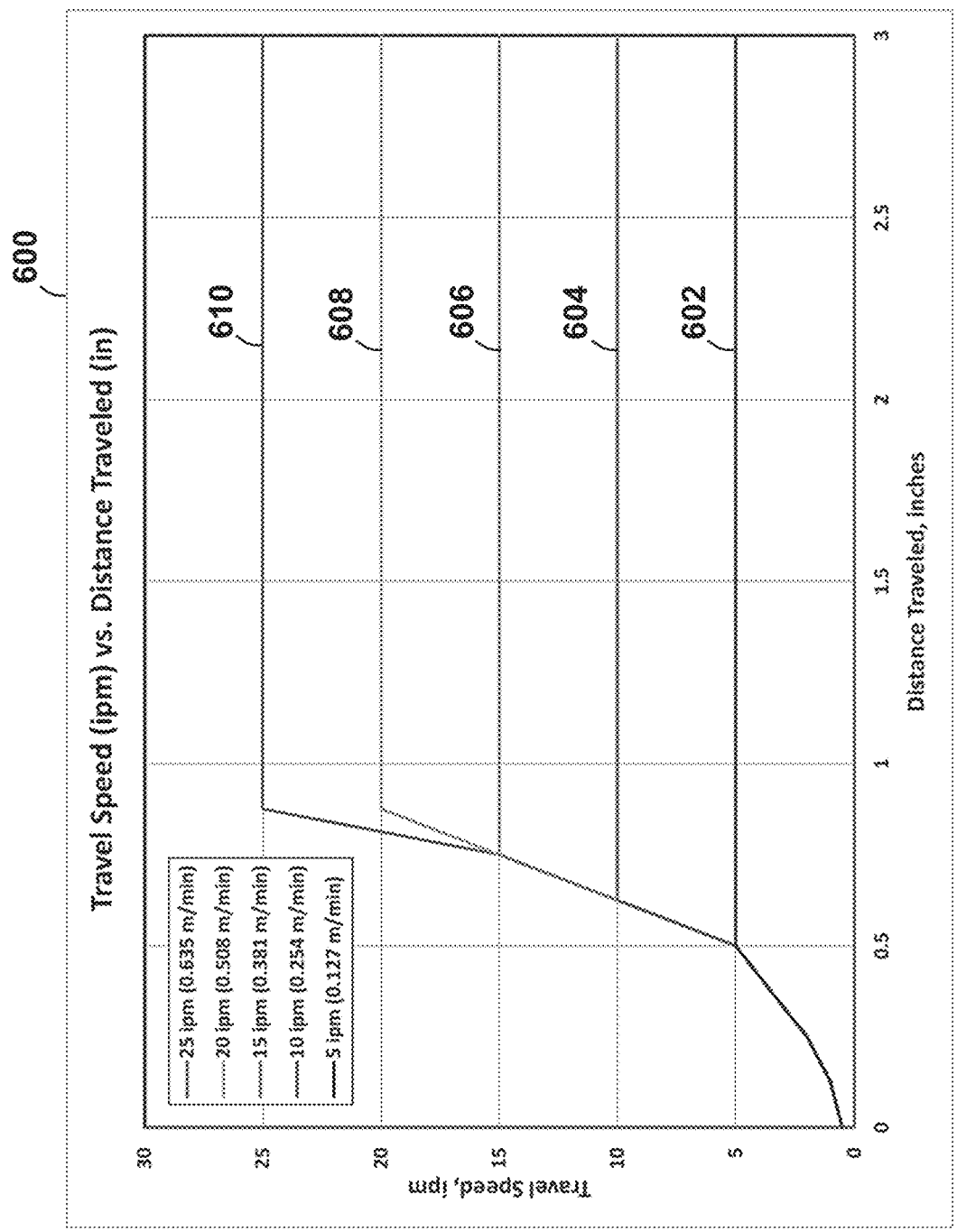
FIG. 21 is a plot showing travel speeds for a tool during the friction stir processing operation according to some embodiments.

For instance, reference is now made to FIG. 21 which shows a plot 600 of various travel speed profiles 602, 604, 606, 608, 610 for a tool 10 that is forming an internal channel 50 within a workpiece 60 according to some embodiments. Each of the profiles 602, 604, 606, 608, 610 has a different final target speed for the tool 10 through the workpiece 60. Specifically, the profile 602 has a target travel speed of 5 inches per minute (ipm), the profile 604 has a target travel speed of 10 ipm, the profile 606 has a target travel speed of 15 ipm, the profile 608 has a target travel speed of 20 ipm, and the profile 610 has a target travel speed of 25 ipm. However, while the profiles 602, 604, 606, 608, 610 have different, final target speeds, each increases the rate of travel for the tool 10 from a relatively low rate up to the final target speed so as to establish and then maintain the thermal plume within the workpiece 60 and thereby form the internal channel 50.

The embodiments described herein include systems and methods for forming internal channels within a workpiece. Through use of the embodiments disclosed herein, internal channels may be formed within a workpiece that are effectively sealed along the length of the channel from the outside environment by the monolithic, one-piece material of the workpiece itself.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of forming an internal channel within a workpiece, the method comprising:
   (a) rotating a tool about a central axis, wherein the tool comprises:
       a tool body including a central axis and a shoulder;
       a pin projected outward from the shoulder along the central axis, wherein the pin includes a flange that is axially spaced from the shoulder along the central axis,
       wherein the shoulder includes a plurality of spiral grooves,
       wherein the flange includes a first surface, a second surface having spiral grooves thereon, and a radially outer surface extending between the first surface and the second surface, and
       wherein the first surface is frustoconical in shape;
   (b) moving the tool across the workpiece in a radial direction with respect to the central axis during (a);
   (c) engaging the shoulder of the tool with an outer surface of the workpiece during (a) and (b);
   (d) submerging the pin and the flange within the workpiece during (a) and (b); and
   (e) forming the internal channel with the flange during (a) and (b).

2. The method of claim 1, wherein (e) comprises forming a deformed region within the workpiece, wherein the internal channel is positioned within the deformed region.

3. The method of claim 2, wherein the workpiece comprises a metal.

4. The method of claim 1, wherein the flange includes a maximum radial width $W_2$, wherein the pin has a maximum radial width $W_1$, and wherein $W_2$ is greater than $W_1$.

5. The method of claim 4, wherein the shoulder comprises a plurality of spiral grooves.

6. The method of claim 1, wherein the first surface includes a first plurality of spiral grooves, and wherein the second surface having the spiral grooves thereon comprises a second plurality of spiral grooves.

7. A tool for forming an internal channel within a workpiece, the tool comprising:
 a tool body including a central axis and a shoulder;
 a pin projected outward from the shoulder along the central axis, wherein the pin includes a flange that is axially spaced from the shoulder along the central axis;
 wherein the shoulder includes a plurality of spiral grooves,
 wherein the flange includes a first surface, a second surface, and a radially outer surface extending between the first surface and the second surface,
 wherein the first surface is positioned axially between the second surface and the shoulder along the central axis, and
 wherein second surface comprises a plurality of spiral grooves.

8. The tool of claim 7, wherein the plurality of spiral grooves spiral inward toward the central axis in a direction that is opposite a rotational direction for the tool body.

9. The tool of claim 7, wherein the plurality of spiral grooves spiral inward toward the central axis in a direction that is aligned with a rotational direction for the tool body.

10. The tool of claim 7, wherein the flange includes a maximum radial width $W_2$, wherein the pin has a maximum radial width $W_1$, and wherein $W_2$ is greater than $W_1$.

11. The tool of claim 7, wherein the first surface is frustoconical in shape.

12. The tool of claim 7, wherein the pin is threadably engaged within a recess extending axially into the shoulder along the central axis.

13. The tool of claim 12, wherein the pin includes an annular shoulder, and wherein the recess includes an annular shoulder, and wherein the pin is threadably engaged within the recess such that the annular shoulder of the pin is engaged with the annular shoulder of the recess.

14. A method of forming an internal channel within a workpiece, wherein the workpiece includes a first surface, a second surface opposite the first surface, and a groove extending into the first surface that extends across the workpiece, the method comprising:
 (a) rotating a tool about a central axis, wherein the tool comprises:
  a tool body including a central axis and a shoulder;
  a pin extending axially from the shoulder along the central axis; and
  a flange mounted to the pin that is spaced from the shoulder along the central axis,
  wherein the shoulder comprises a plurality of spiral grooves,
  wherein the flange includes a first surface, a second surface, and a radially outer surface extending between the first surface and the second surface,
  wherein the first surface is positioned axially between the second surface and the shoulder along the central axis, and
  wherein second surface comprises a plurality of spiral grooves thereon;
 (b) inserting the tool into the workpiece from the first surface such that the flange is positioned between the first surface and the second surface;
 (c) moving the tool across the workpiece along the groove in a radial direction with respect to the central axis;
 (d) engaging the shoulder of the tool with the first surface of the workpiece during (c); and
 (e) forming the internal channel with the flange during (c) and (d).

15. The method of claim 14, wherein the plurality of spiral grooves spiral inward toward the central axis in a direction that is opposite a rotational direction for the tool body.

16. The method of claim 15, wherein the plurality of spiral grooves spiral inward toward the central axis in a direction that is aligned with a rotational direction for the tool body.

17. The method of claim 14, wherein the first surface is frustoconical in shape.

18. A tool for forming an internal channel within a workpiece, the tool comprising:
 a tool body including a central axis and a shoulder;
 a pin projected outward from the shoulder along the central axis, wherein the pin includes a flange that is axially spaced from the shoulder along the central axis;
 wherein the shoulder includes a plurality of spiral grooves, and
 wherein the flange includes a first surface, a second surface, and a radially outer surface extending between the first surface and the second surface, wherein the first surface is positioned axially between the second surface and the shoulder along the central axis, wherein the first surface is frustoconical in shape, and wherein the radially outer surface comprises a plurality of radially extending notches.

19. The tool of claim 18, wherein the first surface includes a first plurality of spiral grooves.

\* \* \* \* \*